(12) United States Patent
Miki

(10) Patent No.: US 7,395,671 B2
(45) Date of Patent: Jul. 8, 2008

(54) CRYOGENIC SYSTEM

(75) Inventor: Takashi Miki, Kobe (JP)

(73) Assignee: Kabushiki Kaisha Kobe Seiko Sho, Hyogo (JP)

( * ) Notice: Subject to any disclaimer, the term of this patent is extended or adjusted under 35 U.S.C. 154(b) by 452 days.

(21) Appl. No.: 11/108,724

(22) Filed: Apr. 19, 2005

(65) Prior Publication Data
US 2006/0086101 A1    Apr. 27, 2006

(30) Foreign Application Priority Data
May 7, 2004    (JP)    ............... 2004-139118

(51) Int. Cl.
F25B 19/00    (2006.01)
F25B 9/00    (2006.01)
(52) U.S. Cl. .................. 62/51.1; 62/6
(58) Field of Classification Search ........... 62/6, 62/51.1, 47.1
See application file for complete search history.

(56) References Cited
U.S. PATENT DOCUMENTS

| | | | |
|---|---|---|---|
| 4,223,540 A * | 9/1980 | Longsworth | 62/51.1 |
| 4,279,127 A * | 7/1981 | Longsworth | 62/77 |
| 4,827,737 A * | 5/1989 | Oda et al. | 62/51.1 |
| 4,884,410 A * | 12/1989 | Bell et al. | 62/77 |
| 5,644,855 A * | 7/1997 | McDermott et al. | 34/516 |
| 5,704,967 A * | 1/1998 | Tom et al. | 96/143 |
| 6,212,904 B1 * | 4/2001 | Arkharov et al. | 62/615 |
| 6,990,818 B2 * | 1/2006 | Hofmann | 62/6 |

FOREIGN PATENT DOCUMENTS
JP    05-223379    2/1992

* cited by examiner

*Primary Examiner*—William C Doerrler
(74) *Attorney, Agent, or Firm*—Reed Smith LLP; Stanley P. Fisher, Esq.; Juan Carlos A. Marquez, Esq.

(57) ABSTRACT

A cryogenic system includes a containment vessel in which a body to be cooled is housed in such a manner that the body is immersed in a liquid coolant; a tubular refrigerator sleeve; and a refrigerator, inserted in the opening section of the refrigerator sleeve, for recondensing coolant gas generated from the coolant, wherein a gas flow-forming means for forming a flow of purge gas toward an opening section of the refrigerator sleeve is provided. The purge gas prevents air from entering a refrigerator sleeve during the replacement of a refrigerator of a cryogenic system.

11 Claims, 8 Drawing Sheets

CRYOGENIC SYSTEM

BACKGROUND OF THE INVENTION

1. Field of the Invention

The present invention relates to a cryogenic system for cooling a superconducting magnet or the like.

2. Description of the Related Art

In conventional apparatuses including superconducting magnets, in order to retain their superconducting properties, it has been necessary to maintain the magnets at a cryogenic temperature close to absolute zero. Examples of a technique for maintaining a magnet at a cryogenic temperature include a technique in which a superconducting magnet is immersed in a coolant such as liquid helium and a technique for directly cooling a superconducting magnet using a cryogenic refrigerator.

FIG. 8 shows a configuration of a known cryogenic system 101. This figure shows a cross section of an MRI system (a magnetic resonance imaging scanner) known as a medical instrument. This system includes a solenoidal superconducting magnet 103 of which the central axis extends horizontally.

The cryogenic system 101, which is of such a type that helium gas is recondensed, includes a containment vessel 102 in which the superconducting magnet 103 is housed in such a manner that the superconducting magnet 103 is immersed in a coolant 104 (liquid helium), a vacuum vessel 105 having a vacuum space surrounding the containment vessel 102, and a thermal shield 106 which is placed in the space so as to surround the containment vessel 102 and which has a function of reducing the amount of radiation heat transferred from the vacuum vessel 105 to the containment vessel 102.

The cryogenic system 101 further includes a tubular refrigerator sleeve 107 which extends through the vacuum vessel 105 and the thermal shield 106, which has a base section communicatively connected into the containment vessel 102, and which has an opening facing outward. The cryogenic system 101 also includes a refrigerator 108, placed in the refrigerator sleeve 107, for recondensing coolant gas generated from the coolant 104 at cryogenic temperature.

Since the refrigerator sleeve 107 and the containment vessel 102 are communicatively connected to each other, an upper zone of the containment vessel 102 and the refrigerator sleeve 107 are filled with the coolant gas of which the pressure is equal to the saturation vapor pressure at a temperature at which the superconducting magnet 103 is operated.

The refrigerator 108 is tubular and long and has two stages: a first cooling stage 119 placed at a middle portion and a second cooling stage 121 placed at an end portion. The first cooling stage 119 is thermally connected to the thermal shield 106 and the second cooling stage 121 is thermally connected to a recondenser 130 (fins). The refrigerator 108 has a cooling capacity sufficient to maintain the second cooling stage 121 at cryogenic temperature (about 4 K). Therefore, the surface temperature of the recondenser 130 is maintained lower than the temperature of the coolant; hence, the vapor of the coolant 104 can be condensed into liquid by making the vapor in contact with the recondenser 130. According to this configuration, it is not necessary to refill the cryogenic system 101 with the coolant 104 as long as the refrigerator 108 can function.

For the refrigerator 108, in order to perform periodic maintenance, the operation is stopped in some cases. During maintenance, the refrigerator 108 is drawn out of the refrigerator sleeve 107 and a new refrigerator 108 is inserted into the refrigerator sleeve 107 and then started up. The operation is continued until the new refrigerator 108 reaches a steady state.

During the maintenance operation, a serious problem described below can arise.

When the refrigerator 108 is drawn out of the sleeve, air and/or moisture of which the amount is equal to the volume of the refrigerator 108 enters the sleeve from outside in some cases. The resulting air and/or moisture is instantaneously condensed in the refrigerator sleeve 107 and fixed thereto. This is because the inside of the refrigerator sleeve 107 is maintained at a temperature lower than outside air temperature, that is, the temperature of the thermal shield 106 is usually 30 to 60 K and the temperature of the bottom of the refrigerator sleeve 7 is 3 to 5 K.

The following problem arises: a problem in that the heat conduction between the thermal shield 106 and a first cooling stage 119 of the new refrigerator 108 is deteriorated due to the fixed air (oxygen and nitrogen) and/or moisture and the refrigerator 108 cannot therefore be operated at full power.

Therefore, when the conduction between the first cooling stage 119 and the thermal shield 106 is low, the contact thermal resistance becomes large. This causes an increase in the temperature of the thermal shield 106 to increase the amount of heat transferred to the containment vessel 102. At worst, the amount of heat transferred to the containment vessel 102 exceeds the liquefaction capacity of the recondenser 130; hence, the whole of the vapor of the coolant 104 cannot be liquefied even if the refrigerator 108 is operated.

Various attempts have been made to achieve an object that the intrusion of air is prevented and the thermal resistance between the refrigerator 108 and the coolant 104 is reduced. In a technique disclosed in, for example, Japanese Unexamined Patent Application Publication No. 5-223379, an expandable, flexible maintenance bag is attached to the proximal end (an external portion of the system) of the refrigerator sleeve 107, deflated by exhausting air from the bag using an exhaust blower, and then inflated by introducing a coolant gas into the bag through a gas line such that an atmosphere filled with the coolant gas is formed. The refrigerator 108 is subjected to maintenance in the atmosphere.

However, it is troublesome to use the technique disclosed in Japanese Unexamined Patent Application Publication No. 5-223379 because the maintenance bag must be attached before the refrigerator 108 is replaced and because the exhaust blower for exhausting air from the bag and other tools must be prepared.

In addition, the replacement is performed in such a manner that an operator inserts his or her hands in a pair of gloves extending in the maintenance bag; hence, this operation is troublesome. The replacement is interrupted in some cases because the maintenance bag is broken.

SUMMARY OF THE INVENTION

In order to solve the above problems, it is an object of the present invention to provide a cryogenic system in which a refrigerator can be readily replaced in such a manner that air is prevented from entering a refrigerator sleeve.

In order to achieve the above object, technical means described below are used in the present invention.

In the present invention, one of the technical means used to solve the problems is as follows: a cryogenic system including a containment vessel in which a body to be cooled is housed in such a manner that the body is immersed in a liquid coolant; a tubular refrigerator sleeve which has a base section communicatively connected into the containment vessel and which has an opening section which can be opened or closed to the outside; and a refrigerator, inserted through the opening section of the refrigerator sleeve, for recondensing coolant gas generated from the coolant, wherein a gas flow-forming means for forming a flow of purge gas from the base section of the refrigerator sleeve to the opening section is provided.

For the refrigerator of the cryogenic system, in order to perform periodic maintenance, the operation is stopped and the refrigerator is drawn out of the refrigerator sleeve in some cases. During this operation, air and/or moisture of which the volume is equal to that of the refrigerator enters the refrigerator sleeve from outside to cause pollution in the refrigerator sleeve. The intrusion thereof can be securely prevented in such a manner that a flow of purge gas from the base section of the refrigerator sleeve to the opening section is formed using the gas flow-forming means and air and/or moisture entering the refrigerator sleeve from outside is whereby blown out.

Cryogenic systems include a type of system using a method in which a body to be cooled is immersed in a coolant maintained at cryogenic temperature such that the body is cooled to a temperature close to absolute zero, the body being housed therein, and another type of system using a method in which a body to be cooled is directly cooled with a refrigerator without using any coolant.

In the refrigerator of the cryogenic system using the direct cooling method, in order to perform periodic maintenance, the operation is stopped and the refrigerator is drawn out of a refrigerator sleeve in some cases; hence, air must be prevented from entering the refrigerator sleeve as described above.

Therefore, the other one of the technical means used to solve the problems is as follows: a cryogenic system including a vacuum vessel in which a body to be cooled is housed; a tubular refrigerator sleeve which has a base section connected to the body, which has an opening section which can be freely opened or closed to the outside, and which includes a side wall for separating an inner section of the vacuum vessel from outside; and a refrigerator, inserted through the opening section of the refrigerator sleeve, for cooling the body, wherein a gas flow-forming means for forming a flow of purge gas from the base section of the refrigerator sleeve to the opening section is provided.

In the cryogenic system using no coolant but using the direct cooling method, since air and/or moisture entering the refrigerator sleeve from outside is blown out by forming a flow of purge gas from the base section of the refrigerator sleeve to the opening section, the intrusion thereof can be securely prevented.

However, even if such a flow of gas outward is created after the refrigerator is drawn out, the following situation cannot be prevented: before the gas flow is stabilized, air and/or moisture enters the refrigerator sleeve and is solidified and then fixed thereto. Therefore, the following procedure is preferable: the gas flow is created in the refrigerator sleeve 7 before the refrigerator is drawn out, the gas flow is stabilized, and the refrigerator is then drawn out.

Therefore, the gas flow-forming means includes a gas inlet pipe, communicatively connected to the base section of the refrigerator sleeve, for supplying purge gas into the refrigerator sleeve from outside and also includes a check valve which is provided at the opening section of the refrigerator sleeve and which is communicatively connected to the outside only.

According to this configuration, the purge gas supplied to the base section of the refrigerator sleeve through the gas inlet pipe flows into the opening section of the refrigerator sleeve and is then released outside through the check valve; hence, the gas flow for preventing the intrusion of air is created before the refrigerator is drawn out. As a matter of course, the gas flow is maintained after the refrigerator is drawn out, whereby the intrusion of air can be securely prevented.

On the other hand, when the operation of the refrigerator reaches a steady state and a recondensation chamber is cooled to a cryogenic temperature (near 4 K), the gas inlet pipe is filled with the purge gas with a temperature gradient ranging from room temperature to such a cryogenic temperature. In the gas inlet pipe filled with the purge gas having such a large temperature gradient, thermoacoustic vibration that causes serious pulsation or vibration sometimes occurs and a huge amount of heat is transferred to low-temperature regions; that is, conditions disadvantageous to cryogenic temperature arise.

Various investigations and experiences show that the following technique is useful in preventing such thermoacoustic vibration from occurring: pipes in which vibration is occurring are connected to large vessels. Therefore, the gas inlet pipe is communicatively connected to the opening section of the refrigerator sleeve with a by-pas pipe, including an on-off valve, placed therebetween.

According to this configuration, the gas inlet pipe can be communicatively connected to the refrigerator sleeve having a large volume with a by-pass pipe placed therebetween when the gas inlet pipe is not in use, whereby thermoacoustic vibration can be prevented from occurring in these pipes.

Although the intrusion of outside air can be prevented by introducing the purge gas into the refrigerator sleeve as described above, the purge gas enters the base section of the gas inlet pipe because the base section is communicatively connected to the containment vessel. The entering purge gas has a temperature significantly higher than that of the liquefied coolant gas and therefore promotes the vaporization of the coolant in the containment vessel, thus causing a loss of the coolant.

Therefore, the purge gas introduced through the gas inlet pipe must be prevented from entering the containment vessel. Thus, the refrigerator sleeve includes a gas-blocking means for preventing the purge gas from entering the containment vessel.

The gas-blocking means includes a connecting pipe placed between the base section of the refrigerator sleeve and the containment vessel and the connecting pipe has a cross-sectional area less than that of the refrigerator sleeve in which the refrigerator is inserted.

According to this configuration, the purge gas discharged from the gas inlet pipe is prevented from flowing toward the containment vessel in which pressure loss occurs due to the small cross-sectional area but is allowed to flow into the opening section of the refrigerator sleeve located on the side opposite to the containment vessel. The purge gas is released outside through the check valve.

The gas-blocking means may include a valve body with which the base section of the refrigerator sleeve can be blocked and which can be operated from outside.

Since the base section of the refrigerator sleeve is blocked with the valve body, the purge gas can be prevented from flowing toward the containment vessel.

The valve body is preferably pressed with a pressing means in the direction to open the base section of the refrigerator sleeve and is connected to a cable for pulling the valve body against the pressing force to close the base section. The cable preferably extends outside through the gas inlet pipe included in the gas flow-forming means and can be pulled from outside.

According to this configuration, when the cable such as a wire is pulled, the base section of the refrigerator sleeve is blocked with the valve body. In contrast, when the cable is relaxed, the base section of the refrigerator sleeve is unblocked because the valve body is moved away from the base section of the refrigerator sleeve by the pressing means.

The valve body may have a portion which has a solder layer or an indium layer at the valve body which can contact with the base section of the refrigerator sleeve.

According to this configuration, since a soft metal material that can be readily distorted is placed between the refrigerator sleeve and the valve body, the purge gas can be securely prevented from entering the refrigerator sleeve.

According to the present invention, a refrigerator can be readily replaced in such a manner that air is prevented from entering a refrigerator sleeve.

DESCRIPTION OF THE PREFERRED EMBODIMENTS

A first embodiment of the present invention will now be described with reference to drawings.

Figure 1:
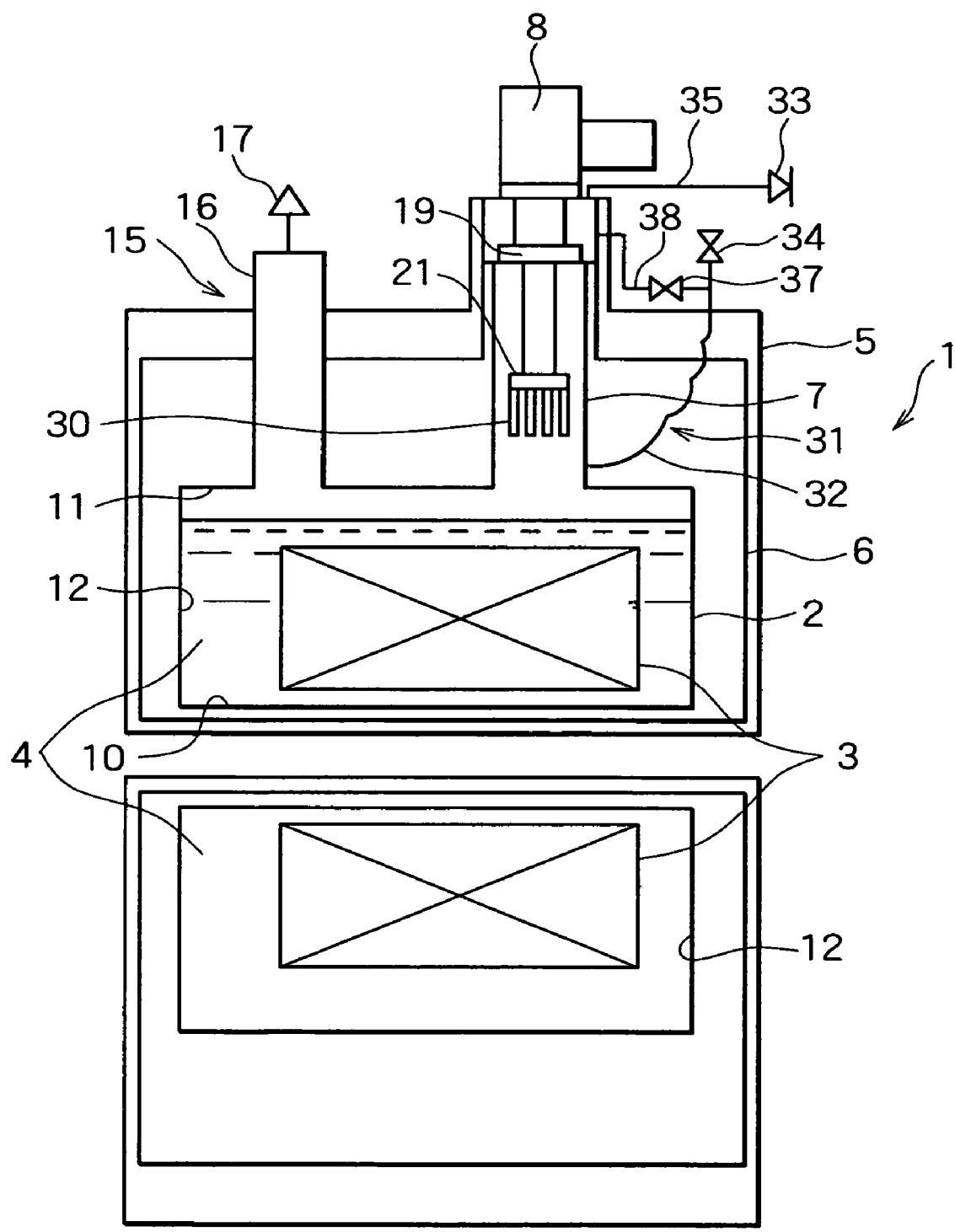
FIG. 1 is a sectional view of a cryogenic system according to a first embodiment of the present invention.

FIG. 1 is a schematic sectional view of MRI which is an example of a cryogenic system.

The cryogenic system 1 includes a containment vessel 2. The containment vessel 2 contains a superconducting magnet 3 that is a body to be cooled, the body being immersed in a liquid coolant 4 that is liquid helium. The containment vessel 2 is surrounded by a vacuum vessel 5 with a space present therebetween and the space is maintained under vacuum. A thermal shield 6 is placed in the space between the containment vessel 2 and the vacuum vessel 5 in such a manner that the thermal shield 6 surrounds the containment vessel 2.

A tubular refrigerator sleeve 7 extends through the vacuum vessel 5 and the thermal shield 6. A base section of the refrigerator sleeve 7 is communicatively connected into the containment vessel 2 and an opening section of the refrigerator sleeve 7 is opening to the outside of the vacuum vessel 5, that is, the outside of the system.

A refrigerator 8 (cryogenic cooling unit) that can achieve a temperature close to absolute zero is detachably inserted in the refrigerator sleeve 7 through the opening section of the refrigerator sleeve 7.

In the description below, the up-to-down or down-to-up direction in FIG. 1 shall be referred to as a vertical direction. Therefore, the side close to the base section of the refrigerator sleeve 7 is referred to as a lower end side and the side close to the opening section thereof is referred to as an upper end side. The upper end side may also be referred to as an open side because the upper end side is open outside.

Since the cryogenic system 1 is MRI, the containment vessel 2 has a doughnut shape wherein the center axis thereof extends horizontally. An inner wall 10 and outer wall 11 of the containment vessel 2 are spaced from each other at a predetermined distance and arranged concentrically. Both ends of the containment vessel 2 are closed by corresponding side walls 12 and an internal space is formed. A tubular space communicatively connected to an outer portion is present between the inner wall 10 and the center axis and an object or person to be inspected is placed in this space.

The solenoidal superconducting magnet 3, which is the body to be cooled, is placed in an internal space of the containment vessel 2 in such a manner that the solenoidal superconducting magnet 3 is immersed in the liquid helium 4 maintained at about 4 K. The amount of liquid helium 4 fed to the containment vessel 2 is sufficient to allow the superconducting magnet 3 to be immersed therein and the containment vessel 2 is not filled completely with the liquid helium 4. An upper zone of the containment vessel 2 is filled with a coolant gas of which the pressure is equal to the saturation vapor pressure at a temperature at which the superconducting magnet 3 is operated.

The vacuum vessel 5 as well as the containment vessel 2 has a doughnut shape and the containment vessel 2 is placed in an internal space of the vacuum vessel 5 coaxially therewith. There is a predetermined gap between the containment vessel 2 and the peripheral and side walls that form the vacuum vessel 5. The gap is maintained under vacuum. The vacuum state securely prevents the propagation of heat transferred from outside due to conduction or convection.

The thermal shield 6 is placed in the gap in such a manner that the thermal shield 6 surrounds the containment vessel 2. The thermal shield 6 blocks off heat radiation (radiation) transferred from outside.

As shown in FIG. 1, the superconducting magnet 3, the containment vessel 2, the thermal shield 6, and the vacuum vessel 5 are arranged coaxially with each other.

The containment vessel 2 includes a relief means 15 for releasing helium gas outside. The relief means 15 includes a relief outlet pipe 16 that is provided so as to communicatively connect the containment vessel 2 to the outside and also includes a relief valve 17 (check valve) provided thereto. According to the relief means 15, helium gas can be securely released outside even if the liquid helium 4 stored in the containment vessel 2 is vaporized because the amount of transferred heat is increased due to some causes such as a deterioration in the degree of vacuum in the vacuum vessel 5, whereby the system can be prevented from being disrupted due to an increase in the pressure in the containment vessel 2.

Figure 2:
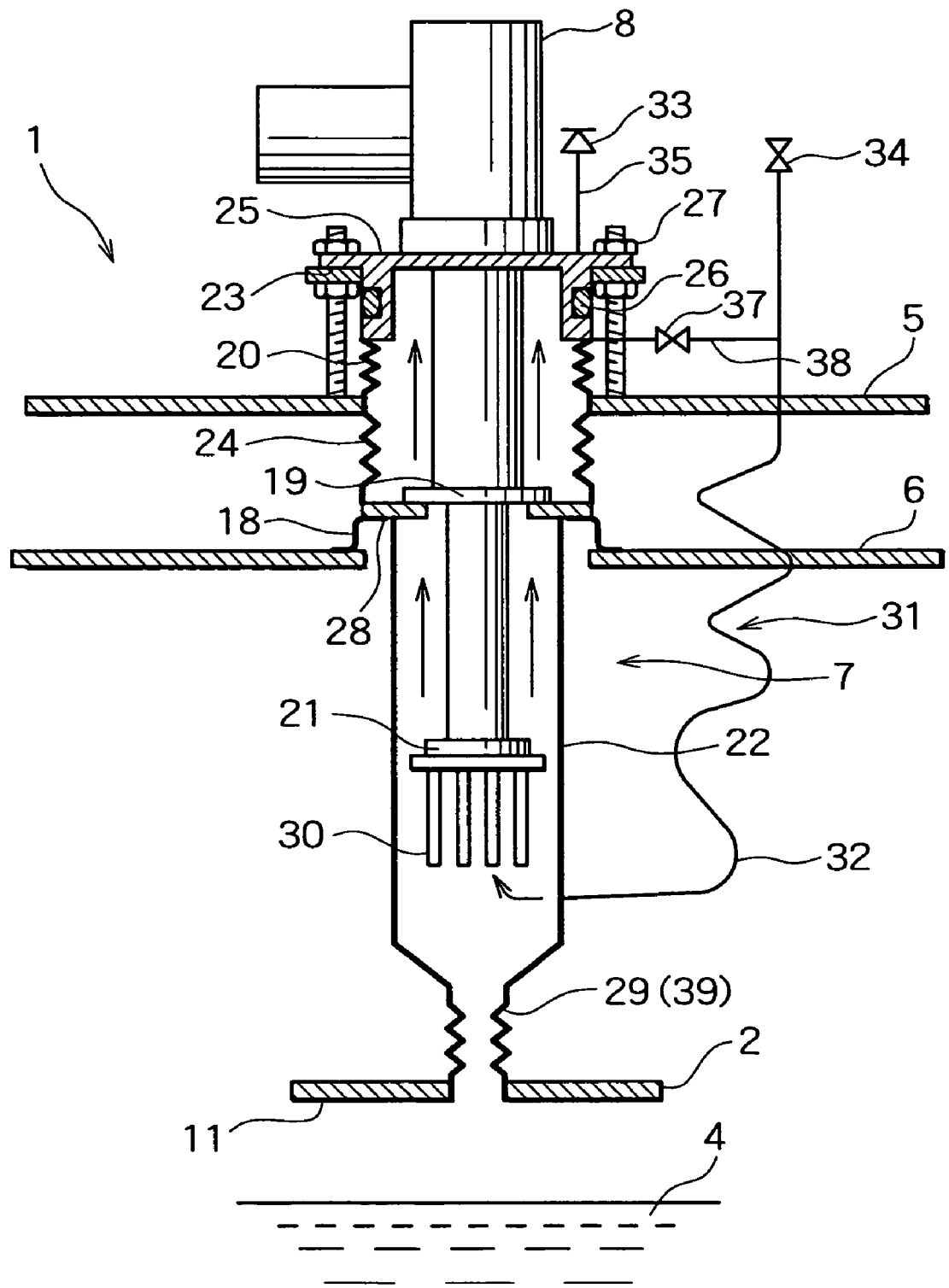
FIG. 2 is an enlarged sectional view of a refrigerator sleeve according to the first embodiment.

FIG. 2 shows a configuration of the refrigerator sleeve 7 and a configuration of the refrigerator 8 inserted therein.

The refrigerator sleeve 7 includes an upper sleeve 20 that is provided so as to surround a first cooling stage 19, described below, included in the refrigerator 8 and also includes a lower sleeve 22 surrounding a second cooling stage 21.

The upper sleeve 20 is made of a thermally insulative material and formed so as to have a tubular shape. An upper flange 23 extending in the diameter direction is formed at the upper end thereof, that is, the opening section. A bellows 24 for absorbing vertical distortion is placed at a middle portion of the upper sleeve 20 extending in the vertical direction.

An upper lid 25 integrated with the refrigerator 8 is hermetically fitted in the opening section with an O-ring 26 placed therebetween and is detachably fixed to the upper flange 23. The upper flange 23 has adjusting volts 27 for adjusting the difference in height between the upper lid 25 and the vacuum vessel 5.

A lower flange 28 is formed on the side close to the lower end of the upper sleeve 20 and is in contact with the first cooling stage 19 of the refrigerator 8. The lower flange 28 is thermally linked to the thermal shield 6 with a thermally conductive member 18, made of woven copper wires, placed therebetween.

The lower sleeve 22 is made of a poor heat conductor. The upper end of the lower sleeve 22 is connected to the lower flange 28. The lower sleeve 22 has a funnel portion located at the lower end thereof and is communicatively connected to an inner portion of the containment vessel 2 with a connecting pipe 29 placed therebetween. The connecting pipe 29 has a bellows shape and can absorb distortion. The space in the lower sleeve 22 is filled with helium gas of which the pressure is equal to the saturation vapor pressure.

The connecting pipe 29 has a cross-sectional area less than that of an intermediate portion of the refrigerator sleeve 7 in which the refrigerator 8 is inserted.

The refrigerator 8 inserted in the refrigerator sleeve 7 as described above is the same as a GM refrigerator 8 and has a long bar shape. The refrigerator 8 has a two-stage configuration consisting of the first cooling stage 19 located at an intermediate portion and the second cooling stage 21 located at an end portion. The upper lid 25 is fixed to the proximal end (a rear portion of the first cooling stage 19) of the refrigerator 8.

The first cooling stage 19 is thermally connected to the thermal shield 6 and strongly cools the thermal shield 6 to prevent the temperature of the liquid helium 4 from increasing. In addition, an opening (not shown) through which a sensor for measuring temperature is inserted is formed in the first cooling stage 19; hence, purge gas described below flows upward through the opening.

The second cooling stage 21 is placed in the lower sleeve 22. The second cooling stage 21 includes a recondenser 30 which is located at an end thereof, which is made of a good heat conductor (for example, copper), and which has a fin shape. Although the second cooling stage 21 has a cooling capacity less than that of the first cooling stage 19, a portion thereof can be cooled to a temperature of 4 K or less. The surface temperature of the recondenser 30 is maintained lower than the temperature of the liquid helium and helium gas can be reliquefied when helium gas is in contact with the recondenser 30. According to this mechanism, the containment vessel 2 need not be refilled with the liquid helium 4 as long as the refrigerator 8 is operated.

For the refrigerator 8, in order to perform periodical maintenance, the operation is stopped in some cases. During maintenance, the refrigerator 8 is drawn out of the refrigerator sleeve 7 and a new refrigerator 8 is inserted in the refrigerator sleeve 7, started up, and then operated until the new refrigerator 8 reaches a steady state.

When the refrigerator 8 is drawn out of the refrigerator sleeve 7, air and/or moisture of which the amount is equal to the volume of the refrigerator 8 enters the refrigerator sleeve 7 from outside in some cases. The entering air and/or moisture is instantaneously condensed in the covering layer 7 and fixed thereto.

Therefore, in order to prevent air from entering the refrigerator sleeve 7 from outside, the refrigerator sleeve 7 includes a gas flow-forming means 31 for forming a flow of purge gas from the lower end (the side close to the containment vessel 2) to the upper end (the open side). The purge gas flow contains helium supplied from outside.

The gas flow-forming means 31 includes a gas inlet pipe 32, communicatively connected to the base section of the refrigerator sleeve 7, for supplying helium gas to the refrigerator sleeve 7 and also includes a check valve 33. The check valve 33 is placed in the opening section of the refrigerator sleeve 7 and is communicatively connected to the outside only.

In particular, the gas inlet pipe 32 is a hollow tube made of a material with low heat conductivity and has an end portion communicatively connected to a portion of a side wall of the refrigerator sleeve 7, this portion being located below the recondenser 30. The gas inlet pipe 32 extends through the thermal shield 6 and the vacuum vessel 5, and further extends outside. The proximal end of the gas inlet pipe 32 is connected to a helium gas cylinder (not shown) with an on-off valve 34 or the like placed therebetween.

On the other hand, an outlet pipe 35 communicatively connected to an inner portion of the refrigerator sleeve 7 is connected to the upper lid 25. The check valve 33 is fitted to the outlet pipe 35, whereby the pressure in the refrigerator sleeve 7 is maintained constant by releasing helium gas remaining in the refrigerator sleeve 7 when the pressure in the refrigerator sleeve 7 is increased to a predetermined value higher than atmospheric pressure.

The gas inlet pipe 32 is communicatively connected to the opening section of the refrigerator sleeve 7 with a by-pas pipe 38, including an on-off valve 37, placed therebetween.

That is, the by-pass pipe 38 branches from the gas inlet pipe 32 at a portion extending outside and is connected to a section of a side wall of the upper sleeve 20 extending out of the vacuum vessel 5.

The proximal end of the gas inlet pipe 32 is communicatively connected to the proximal end of the refrigerator sleeve 7 by opening the on-off valve 37. Helium gas introduced in the containment vessel 2 is supplied only to a lower portion of the refrigerator sleeve 7 by closing the on-off valve 37.

For the refrigerator 8, in order to perform periodical maintenance, the operation can be stopped in some cases. During maintenance, the refrigerator 8 is drawn out of the refrigerator sleeve 7 and a new refrigerator 8 is then inserted in the refrigerator sleeve 7.

When the fitted refrigerator 8 is drawn out, helium gas (purge gas) is allowed to flow into a lower portion of the refrigerator sleeve 7 in substantially an adiabatic manner through the gas inlet pipe 32. The introduced helium gas flows from a lower portion of the recondenser 30 through the lower sleeve 22 and then the upper sleeve 20 while the helium gas is warming the whole of the refrigerator 8. The introduced helium gas then flows into the air through the check valve 33.

At a point of time when the temperature of, for example, a periphery of the recondenser 30 is increased to a value higher than or equal to the boiling point of oxygen, the refrigerator 8 and the upper lid 25 of the refrigerator sleeve 7 are pulled up together in such a manner that the introduction of the gas is continued. After the refrigerator 8 is completely drawn out of the refrigerator sleeve 7, the new refrigerator 8 is fitted in the refrigerator sleeve 7 in such a manner that helium gas is allowed to continuously flow from the lower end to the upper end.

This allows the purge gas to continuously flow upward from the lower-end of the refrigerator sleeve 7, thereby securely preventing air (oxygen, nitrogen, moisture, and/or the like) from entering the refrigerator sleeve 7.

The injection of the helium gas is stopped by closing the on-off valve 34 at the point of time when the insertion of the refrigerator 8 is completed. The cryogenic refrigerator 8 is then restarted in such a manner that the by-pass pipe 38 is unblocked.

It is very preferable to create a flow of helium gas in the refrigerator sleeve 7 before the refrigerator 8 is drawn out. This is because if the helium gas flow is created after the refrigerator 8 is drawn out, air and/or moisture, which is solidified and fixed to the refrigerator sleeve 7, can hardly be prevented from entering the refrigerator sleeve 7 before the helium gas flow is stabilized.

Since the purge gas is allowed to flow in the refrigerator sleeve 7 in the order of "the lower end of the refrigerator sleeve 7, an opening of the first cooling stage 19, the check valve 33, and the outside" before the refrigerator 8 is drawn out, the refrigerator 8 can be drawn out under such a condition that the flow is stable; hence, the intrusion of air can be securely prevented.

The connecting pipe 29 provided under the refrigerator sleeve 7 has a cross-sectional area less than the cross-sectional area (that is, a value obtained by subtracting the cross-sectional area of the refrigerator 8 from the cross-sectional area of the refrigerator sleeve 7) of a space located at an intermediate position of the refrigerator sleeve 7 in which the refrigerator 8 is inserted; hence, the helium gas introduced in the refrigerator sleeve 7 hardly flows toward the containment vessel 2 because pressure loss is created due to the small cross-sectional area but flows toward the upper end of the refrigerator sleeve 7 to leak out through the check valve 33. That is, the connecting pipe 29 functions as a gas-blocking means 39 for preventing the helium gas supplied through the gas inlet pipe 32 from entering the containment vessel 2.

On the other hand, the by-pass pipe 38 functions as described below.

When the refrigerator 8 is restarted and then reaches a steady state and the temperature of a recondensation chamber reaches about 4 K, the gas inlet pipe 32 is filled with helium gas with a temperature gradient ranging from room temperature to a temperature close to absolute zero. In pipes filled with gas having such a large temperature gradient, thermoacoustic vibration occurs in the gas and a huge amount of heat is transferred; hence, a large amount of heat is transferred to such a recondensation chamber (see, for example, Handbook of Superconducting and Cryogenic Engineering edited by Cryogenic Association of Japan).

However, since the by-pass pipe 38 is used and the gas inlet pipe 32 is connected to the refrigerator sleeve 7 having a large volume, such thermoacoustic vibration can be prevented from occurring.

Figure 3:
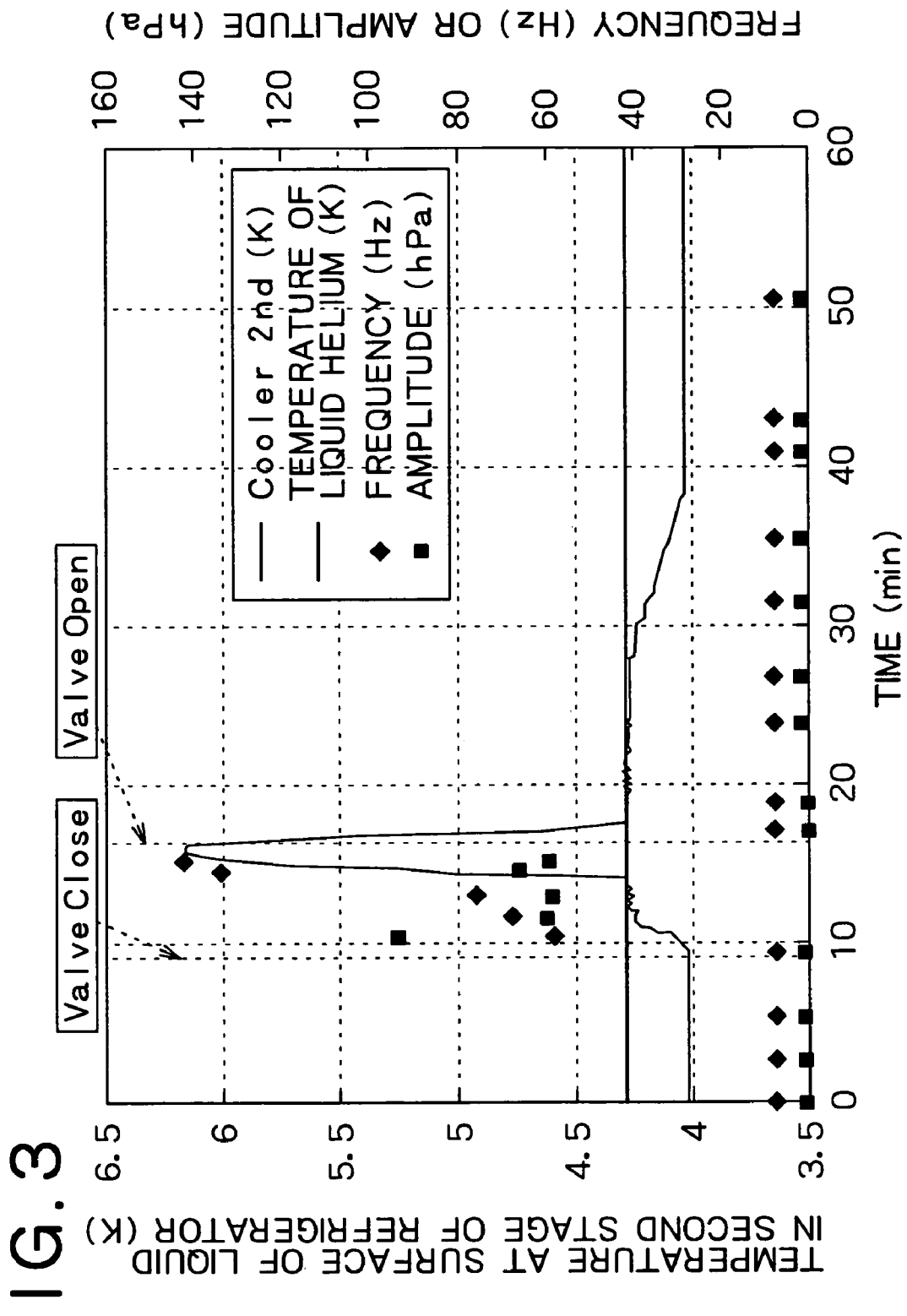
FIG. 3 is a graph illustrating a situation in which thermoacoustic vibration is occurring.

FIG. 3 shows a situation in which an effect of the by-pas pipe 38 included in the cryogenic system 1 of this embodiment clearly appears. In the figure, the right vertical axis represents the amplitude and frequency of pressure vibration occurring in the gas inlet pipe 32, the amplitude and the frequency being measured at the position of the on-off valve 34 placed in the gas inlet pipe 32. The left vertical axis represents the temperature of the second cooling stage 21. The horizontal axis represents the time.

When the refrigerator 8 is in a steady state, the pressure in the containment vessel 2 is less than or equal to atmospheric pressure and the temperature of the liquid helium 4 is about 4K. In this situation, when the by-pass pipe 38 is blocked by closing the on-off valve 37, the amplitude and frequency of pressure fluctuations is sharply increased and the temperature of the recondenser 30 is also sharply increased. This is because thermoacoustic vibration occurring in the gas inlet pipe 32 causes a large amount of heat to be transferred to the periphery of the recondenser 30 through the gas inlet pipe 32.

In contrast, it is understandable that when the by-pass pipe 38 is unblocked in that situation, the temperature of the recondenser 30 is returned to the original value.

A cryogenic system according to a second embodiment of the present invention will now be described.

Figure 4:
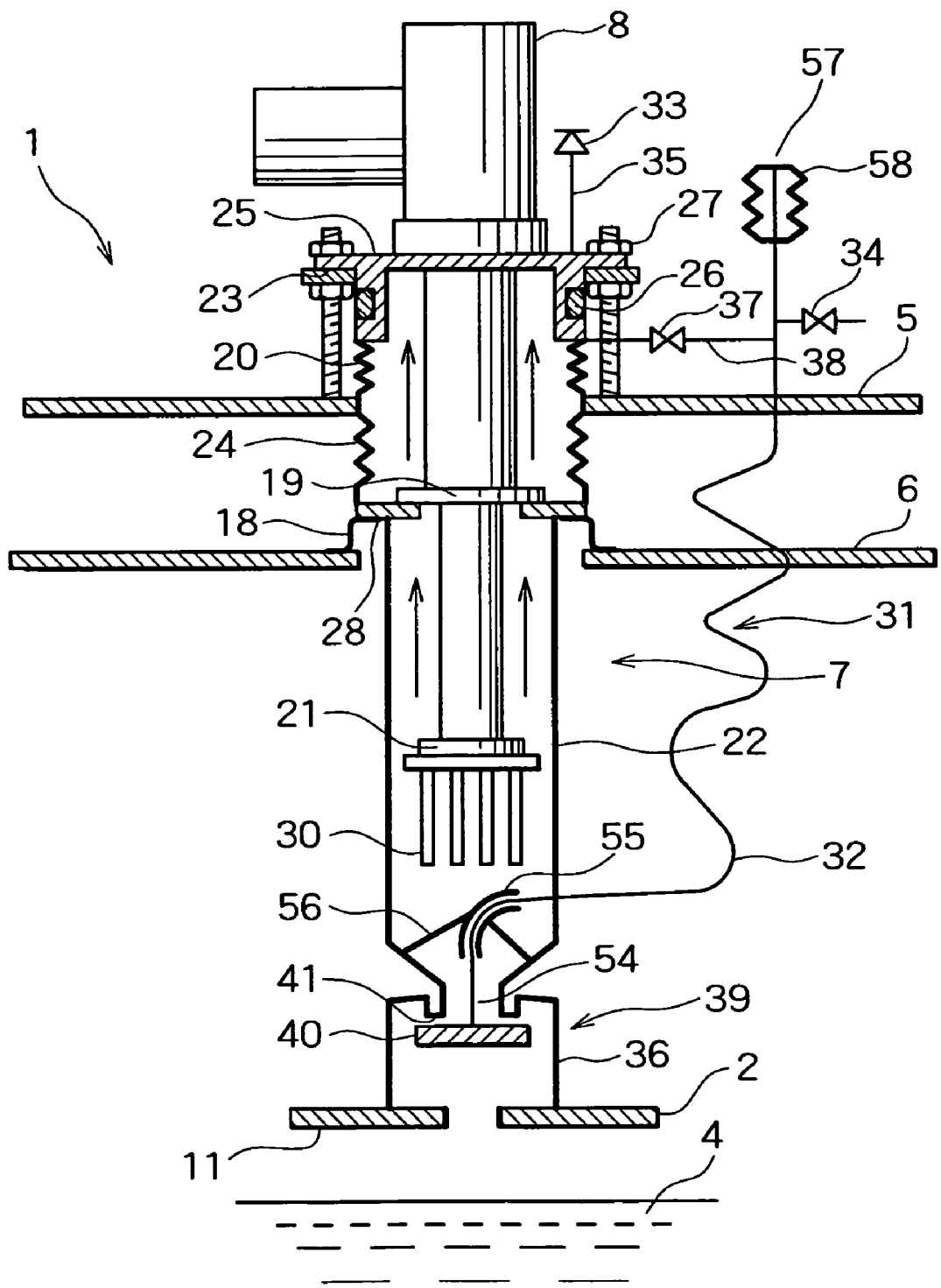
FIG. 4 is an enlarged sectional view of a refrigerator sleeve according to a second embodiment.
Figure 5:
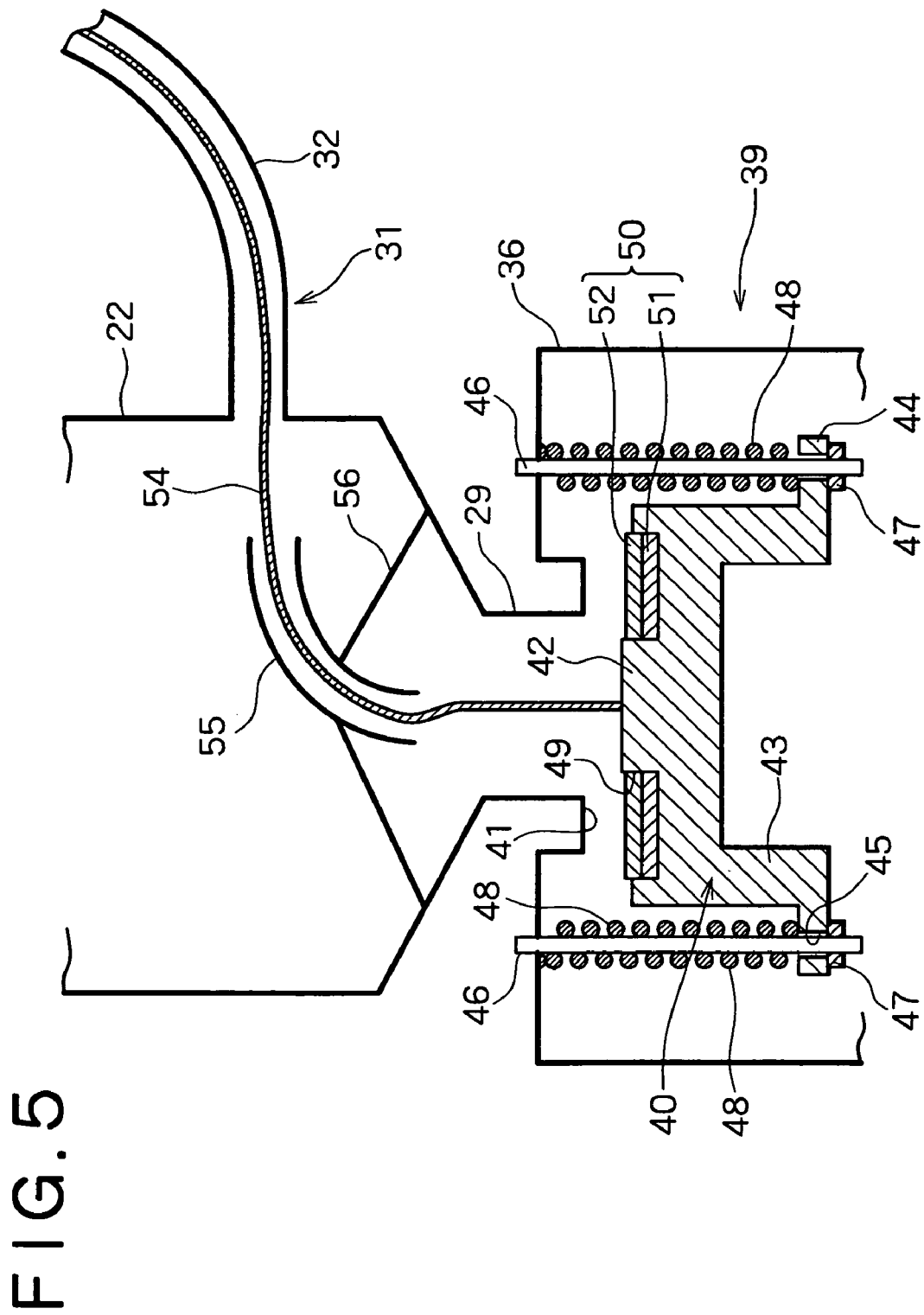
FIG. 5 is an enlarged sectional view of a valve body according to the second embodiment.

As shown in FIGS. 4 and 5, in the second embodiment, a gas-blocking means 39 is significantly different from that of the first embodiment; however, other components are substantially the same as those of the first embodiment.

That is, the gas-blocking means 39 includes a valve body 40 with which a base section of a refrigerator sleeve 7 can be blocked and which can be freely operated from outside.

That is, the valve body 40 is a copper disk which is provided in a connecting chamber 36 connected to a containment vessel 2 and which is placed below a connecting pipe 29. The valve body 40 includes a disk section 42, placed horizontally, for blocking an aperture section 41 placed between the connecting pipe 29 and the connecting chamber 36; a peripheral section 43 provided such that it perpendicularly extends downward from the edge of the disk section 42; and a flange section 44 extending outward from the lower end of the peripheral section 43 in the diameter direction. The flange section 44 has a plurality of perforations 45 extending vertically.

Support rods 46 are each loosely inserted in the corresponding perforations 45. The upper ends of the support rods 46 are fixed to an upper portion of the connecting chamber 36 of the containment vessel 2 and the lower ends thereof have stoppers 47 for preventing the valve body 40 from being detached. Springs 48 for pressing the valve body 40 downward to maintain an open state are arranged between the upper portion of the connecting chamber 36 and the flange section 44 of the valve body 40 in such a manner that the springs 48 are each wound around the corresponding support rods 46 (pressing means).

The upper face of the disk section 42 of the valve body 40 has a region that is in contact with the aperture section 41. A groove section 49 having a ring shape when viewed from above is formed in the region and a plating layer 50 including two sub-layers are formed on the region. The lower one is a solder plating sub-layer 51 and the upper one is an indium plating sub-layer 52. Materials with high wettability are combined to form the plating layer 50. The reason why an outer region of the plating layer 50 contains indium is to allow the plating layer 50 to have relatively high softness at low temperature at which this low-temperature block valve is operated.

The valve body 40 is connected to a cable 54 (wire) for pulling the valve body 40 against the pressing force such that the aperture section 41 is blocked. The cable 54 extends outside through the gas inlet pipe 32 and can therefore be pulled from outside.

In particular, an end of the wire 54 made of metal is fixed to substantially the center of the disk section 42. The wire 54 extends through a guide tube 55 having a tubular shape into the gas inlet pipe 32 and further extends outside. The guide tube 55 has an opening facing downward and another opening that faces substantially horizontally in the direction toward the gas inlet pipe 32. The guide tube 55 is supported with a plurality of support legs 56 arranged in a funnel section of the refrigerator sleeve 7. The support legs 56 have a rod shape so as not to separate the containment vessel 2 from the refrigerator sleeve 7.

The proximal end of the wire 54 that extends outside is connected to a pulling handle 57. The pulling handle 57 is connected to the gas inlet pipe 32 with a bellows body 58 placed therebetween, whereby an internal section of the gas inlet pipe 32 is securely isolated from outside. The valve body 40 can be moved to an opening position against the pressing force of the springs 48 by operating the pulling handle 57.

When helium gas is introduced into the refrigerator sleeve 7 through the gas inlet pipe 32 in the same manner as that of the first embodiment, the aperture section 41 of the connecting pipe 29 is sealed with the valve body 40 by operating the pulling handle 57. This prevents helium gas with high temperature from entering the containment vessel 2, thereby preventing liquid helium 4 in the containment vessel 2 from being vaporized.

A cryogenic system according to a third embodiment of the present invention will now be described.

Figure 6:
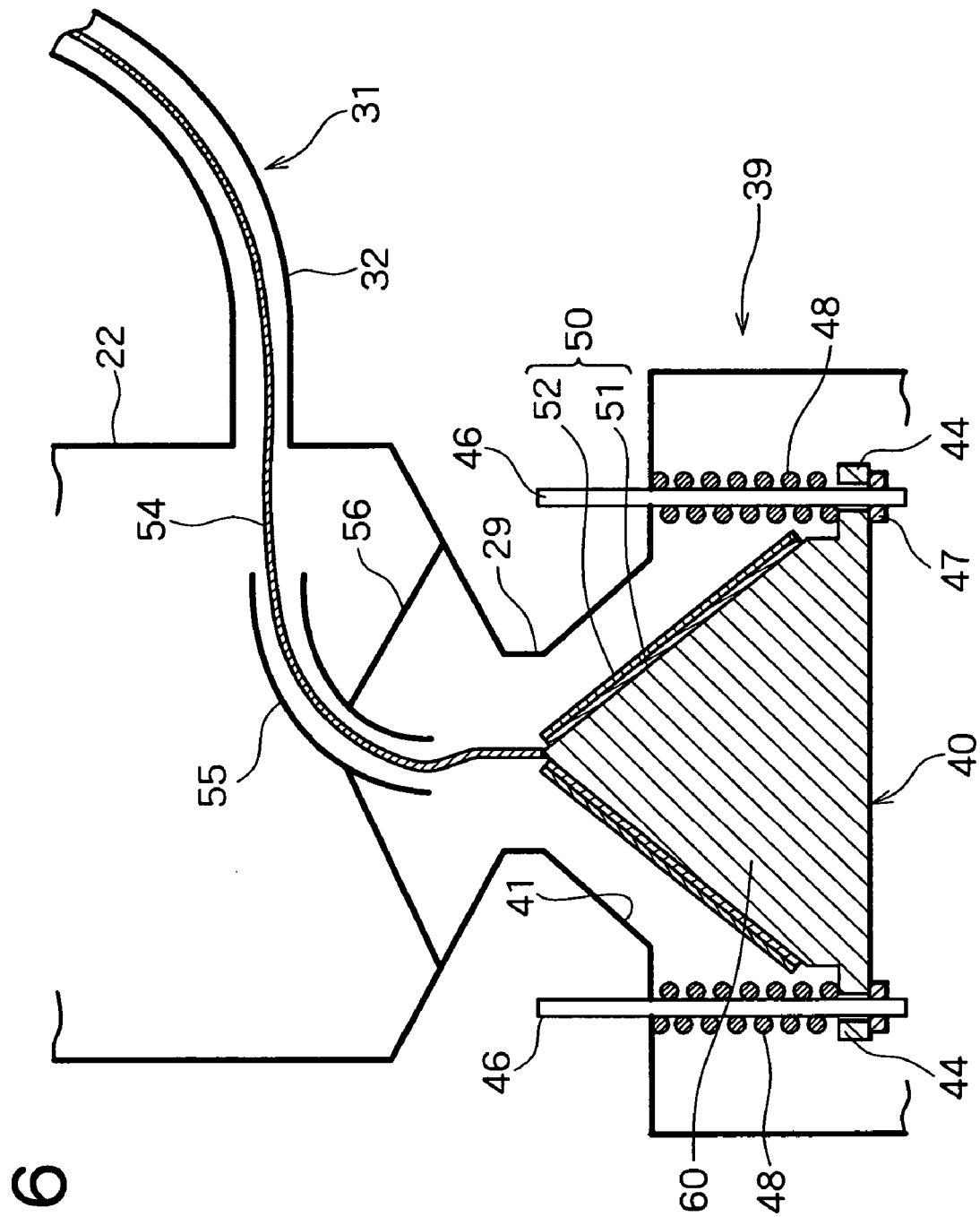
FIG. 6 is an enlarged sectional view of a valve body according to a third embodiment.

As shown in FIG. 6, in the third embodiment, a gas-blocking means 39 is significantly different from that of the second embodiment; however, other components are substantially the same as those of the second embodiment.

A valve body 40 does not have a disk shape but has a cone shape and an aperture section 41 has a funnel shape (such a shape as an ordinary funnel is upside down) such that a cone section 60 of the valve body 40 is fitted in the aperture section 41. The cone section 60 has a face in contact with the aperture section 41 and a plating layer 50, including two sub-layers, similar to that of the second embodiment is formed on this face.

Since the valve body 40 has such a cone shape as described above, the valve body 40 has a large area in contact with the aperture section 41; hence, the aperture section 41 can be securely sealed with the valve body 40.

Figure 7:
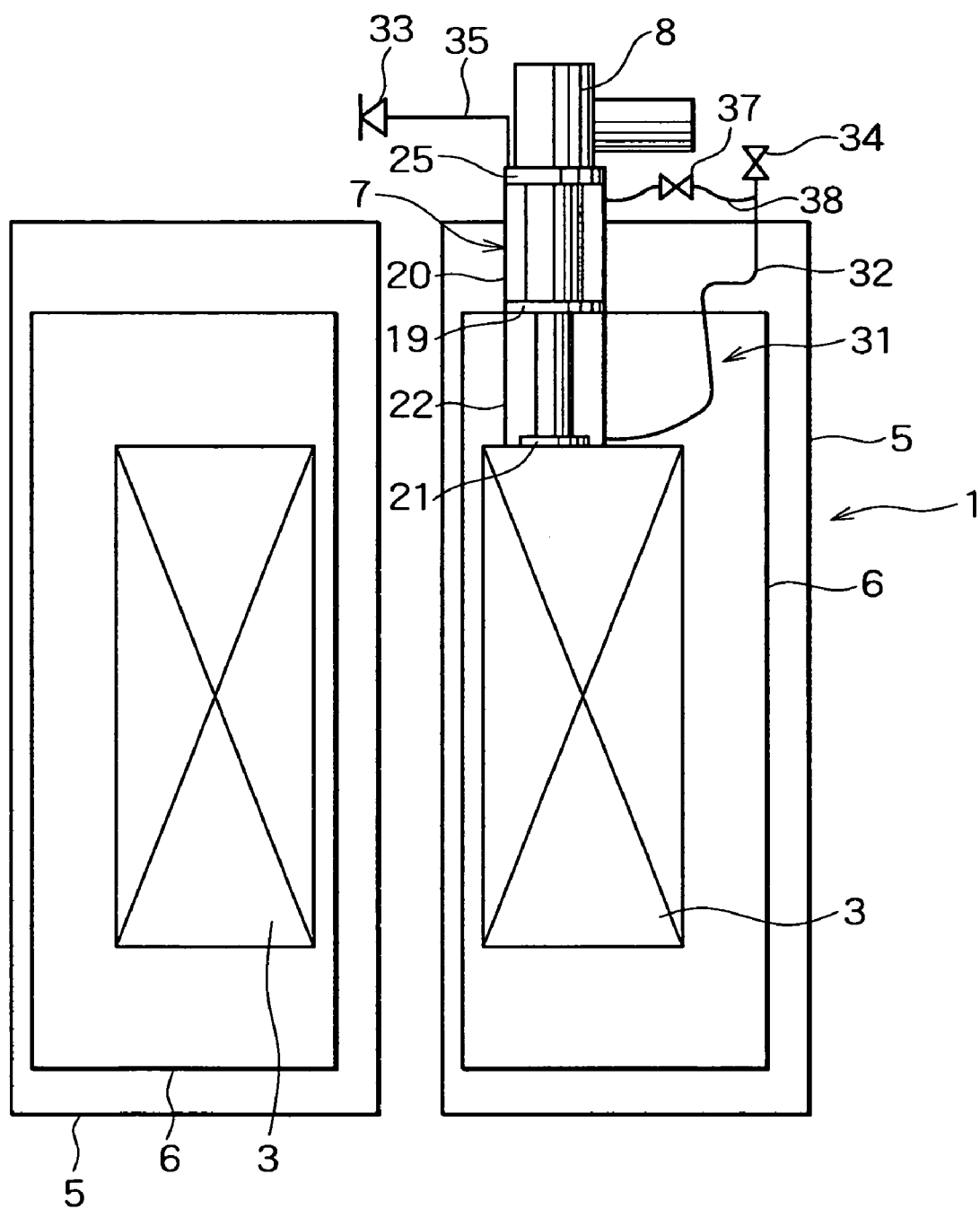
FIG. 7 is an illustration showing a fourth embodiment of the present invention.
Figure 8:
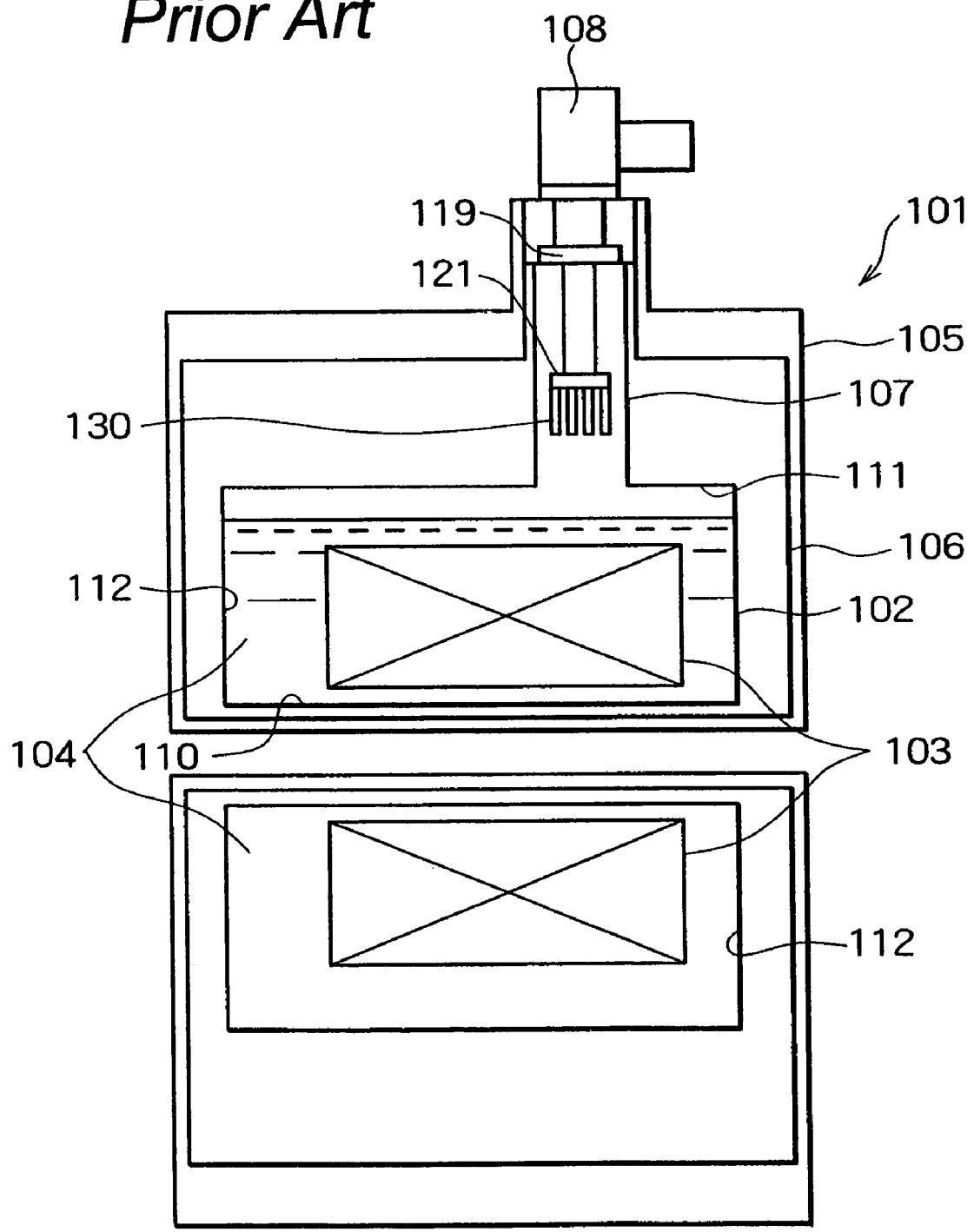
FIG. 8 is an illustration showing a known example.

FIG. 7 shows a fourth embodiment of the present invention.

Cryogenic systems include a type of system using a method for cooling a superconducting magnet by immersing the magnet in a cryogenic coolant such as liquid helium and another type of system using a method for directly cooling a superconducting magnet using a refrigerator instead of such a coolant.

A cryogenic system 1 shown in FIG. 7 uses a direct cooling method and includes a vacuum vessel 5, a tubular refrigerator sleeve 7 and a refrigerator 8. A body 3 to be cooled is housed in the vacuum vessel 5. The tubular refrigerator sleeve 7 has a base section connected to the body 3 to be cooled, has an opening section that can be opened or closed to the outside, and has a side wall for isolating the vacuum vessel 5 from the outside. The refrigerator 8 is inserted through the opening section of the refrigerator sleeve 7 and cools the body 3 to be cooled.

The cryogenic system 1 includes a gas flow-forming means 31 for forming a flow of purge gas from the base section of the refrigerator sleeve 7 toward the opening section thereof.

In particular, the cryogenic system 1 includes the vacuum vessel 5 of which the internal space is maintained under vacuum and a superconducting magnet that is the body 3 to be cooled is housed in the vacuum vessel 5 in such a manner that the superconducting magnet is hung with a wire or the like. A thermal shield 6 is placed between the superconducting magnet 3 and the vacuum vessel 5 in such a manner that the thermal shield 6 surrounds the superconducting magnet 3. As shown in FIG. 7, the superconducting magnet 3, the thermal shield 6, and the vacuum vessel 5 are arranged coaxially with each other. In this figure, the center axis extending vertically is shown.

The refrigerator sleeve 7 includes an upper sleeve 20 that is provided so as to surround a first cooling stage 19 of the refrigerator 8 and also includes a lower sleeve 22 surrounding a second cooling stage 21.

The lower end of the upper sleeve 20 is connected to the upper end of the lower sleeve 22, is in contact with the first cooling stage 19 of the refrigerator 8, and is thermally linked with the thermal shield 6. The lower end of the lower sleeve 22 is connected to a side portion of the superconducting magnet 3.

As described above, since the lower end of the lower sleeve 22 is securely connected to the superconducting magnet 3 and the tubular side walls of the upper sleeve 20 and the lower sleeve 22 have a function of isolating an internal section of the vacuum vessel 5 from an external section of the system 1, an internal section of the refrigerator sleeve 7 is disconnected from the internal section of the vacuum vessel 5. Therefore, if the refrigerator 8 is drawn out during the maintenance of the refrigerator, the vacuum vessel 5 can be maintained under vacuum.

In this cryogenic system 1, when the refrigerator 8 is drawn out of the refrigerator sleeve 7 during maintenance, air and/or moisture of which the amount is equal to the volume of the refrigerator 8 enters the refrigerator sleeve 7 from outside in some cases. The entering air and/or moisture is instantaneously condensed in the covering layer 7 and fixed thereto.

Therefore, in order to prevent air from entering the refrigerator sleeve 7 from outside in the same manner as that of the first embodiment, the refrigerator sleeve 7 includes a gas flow-forming means 31 for forming a flow of purge gas from the lower end (the side close to the superconducting magnet 3) to the upper end (the open side). The purge gas flow contains helium supplied from outside.

The gas flow-forming means 31 includes a gas inlet pipe 32 and a check valve 33. The gas inlet pipe 32 is communicatively connected to the base section of the refrigerator sleeve 7, for supplying helium gas to the refrigerator sleeve 7. The check valve 33 is placed in the opening section of the refrigerator sleeve 7 and is communicatively connected to the outside only.

In particular, the gas inlet pipe 32 is a hollow tube made of a material with low heat conductivity and has an end portion communicatively connected to a lower portion of a side wall of the refrigerator sleeve 7. The gas inlet pipe 32 extends through the thermal shield 6 and the vacuum vessel 5 and further extends outside. The proximal end of the gas inlet pipe 32 is connected to a helium gas cylinder (not shown) with an on-off valve 34 or the like placed therebetween.

On the other hand, an outlet pipe 35 communicatively connected to an inner portion of the refrigerator sleeve 7 is connected to the upper lid 25. The check valve 33 is fitted to the outlet pipe 35, whereby the pressure in the refrigerator sleeve 7 is maintained constant by releasing helium gas remaining in the refrigerator sleeve 7 when the pressure in the refrigerator sleeve 7 is increased to a predetermined value higher than atmospheric pressure.

The gas inlet pipe 32 is communicatively connected to the opening section of the refrigerator sleeve 7 with a by-pass pipe 38, including an on-off valve 37, placed therebetween.

That is, the by-pass pipe 38 branches from the gas inlet pipe 32 at a portion extending outside and is connected to a section of a side wall of the upper sleeve 20, the section extending out of the vacuum vessel 5.

The proximal end of the gas inlet pipe 32 is communicatively connected to the proximal end of the refrigerator sleeve 7 by opening the on-off valve 37. Helium gas introduced in the containment vessel 2 is supplied only to a lower portion of the refrigerator sleeve 7 by closing the on-off valve 37.

Since the operation and effect of the gas flow-forming means 31 and the by-pass pipe 38 are substantially the same as those of the first embodiment, the descriptions thereof are omitted.

The present invention is not limited to the above embodiments.

That is, a gas flow-forming means 31 according to the present invention can be used for a hermetically sealed cryogenic system including a base section of a refrigerator sleeve 7 and a containment vessel 2 that are shielded.

A plating layer 50 provided on a valve body 40 may include either a solder plating sub-layer 51 or an indium plating sub-layer 52 only.

A valve body 40 may be moved to an opening position, without using a pressing means such as a spring 48, in such a manner that the valve body 40 is moved downward due to its own weight.

The present invention can be used in the medical device industry manufacturing MRI systems or the like and the precision instrument industry manufacturing NMR systems.

What is claimed is:

1. A cryogenic system comprising:
    a body to be cooled;
    a containment vessel in which said body to be cooled is housed in such a manner that said body is immersed in a liquid coolant;
    a tubular refrigerator sleeve having a base section communicatively connected into said containment vessel and an opening section which can be opened or closed to the outside;
    a refrigerator for recondensing coolant gas generated from the coolant, said refrigerator being inserted through said opening section of said refrigerator sleeve; and
    a gas flow-forming means for forming a flow of purge gas from said base section of said refrigerator sleeve to said opening section when said opening section directly opens to outside, thereby blowing out external air which otherwise enters into said refrigerator sleeve via said opening section.

2. A cryogenic system comprising:
    a body to be cooled;
    a vacuum vessel in which said body to be cooled is housed;
    a tubular refrigerator sleeve having a base section connected to said body, an opening section which can be freely opened or closed to the outside, and a side wall for separating an inner section of said vacuum vessel from outside;
    a refrigerator for cooling said body, said refrigerator being inserted through said opening section of said refrigerator sleeve; and
    a gas flow-forming means for forming a flow of purge gas from the base section of the refrigerator sleeve to the opening section when said opening section directly opens to outside, thereby blowing out external air which otherwise enters into said refrigerator sleeve via said opening section.

3. The cryogenic system according to claim 1, wherein said gas flow-forming means includes a gas inlet pipe, communicatively connected to said base section of said refrigerator sleeve, for supplying purge gas into said refrigerator sleeve from outside, and includes a check valve which is provided at the opening section of said refrigerator sleeve and which is communicatively connected to the outside only.

4. The cryogenic system according to claim 3, wherein said gas inlet pipe is communicatively connected to the opening section of said refrigerator sleeve with a by-pass pipe, including an on-off valve, placed therebetween.

5. The cryogenic system according to claim 1, wherein said refrigerator sleeve includes a gas-blocking means for preventing the purge gas from entering said containment vessel.

6. The cryogenic system according to claim 5, wherein said gas-blocking means includes a connecting pipe placed between the base section of said refrigerator sleeve and said containment vessel and wherein said connecting pipe has a cross-sectional area less than that of said refrigerator sleeve in which said refrigerator is inserted.

7. The cryogenic system according to claim 5, wherein said gas-blocking means includes a valve body with which the base section of said refrigerator sleeve can be blocked and which can be operated from outside.

8. The cryogenic system according to claim 7, wherein said valve body is pressed with a pressing means in the direction to open the base section of said refrigerator sleeve and is connected to a cable for pulling said valve body against the pressing force to close said base section, and wherein said cable extends outside through said gas inlet pipe included in said gas flow-forming means and can be pulled from outside.

9. The cryogenic system according to claim 7, wherein said valve body has a portion which has a solder layer or an indium layer at which said valve body can contact with said base section of said refrigerator sleeve.

10. The cryogenic system according to claim 2, wherein said gas flow-forming means includes a gas inlet pipe, communicatively connected to said base section of said refrigerator sleeve, for supplying purge gas into said refrigerator sleeve from outside, and includes a check valve which is provided at the opening section of said refrigerator sleeve and which is communicatively connected to the outside only.

11. The cryogenic system according to claim 10, wherein said gas inlet pipe is communicatively connected to the opening section of said refrigerator sleeve with a by-pass pipe, including an on-off valve, placed therebetween.

* * * * *